(12) United States Patent
Sugiura

(10) Patent No.: US 12,021,286 B2
(45) Date of Patent: Jun. 25, 2024

(54) FUEL CELL SYSTEM

(71) Applicant: HONDA MOTOR CO., LTD., Tokyo (JP)

(72) Inventor: Seiji Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/667,570

(22) Filed: Feb. 9, 2022

(65) Prior Publication Data

US 2022/0311041 A1 Sep. 29, 2022

(30) Foreign Application Priority Data

Mar. 24, 2021 (JP) ................. 2021-050559

(51) Int. Cl.
*H01M 8/2484* (2016.01)
*H01M 8/04082* (2016.01)
*H01M 8/04089* (2016.01)
*H01M 8/04746* (2016.01)

(52) U.S. Cl.
CPC ..... *H01M 8/2484* (2016.02); *H01M 8/04089* (2013.01); *H01M 8/04201* (2013.01); *H01M 8/04753* (2013.01); *H01M 8/04761* (2013.01)

(58) Field of Classification Search
None
See application file for complete search history.

(56) References Cited

U.S. PATENT DOCUMENTS

2004/0185319 A1* 9/2004 Enjoji ................. H02J 1/10
429/432
2005/0130019 A1* 6/2005 Cho ................. H01M 8/2484
429/444

FOREIGN PATENT DOCUMENTS

CN 112599832 A * 4/2021 ............. B60L 50/72
JP 2005-005196 1/2005

OTHER PUBLICATIONS

CN112599832; machine translation (Year: 2021).*

* cited by examiner

*Primary Examiner* — Haroon S. Sheikh
(74) *Attorney, Agent, or Firm* — Amin, Turocy & Watson, LLP

(57) ABSTRACT

A fuel cell system includes a first fuel cell stack, a second fuel cell stack, a supply pipeline having a branching portion, a discharge pipeline having a merging portion, a first branching pipeline, a second branching pipeline, a first merging pipeline and a second merging pipeline. Sizes of cross sections of flows of the respective pipelines are the same. A length of the first branching pipeline connected to the branching portion and the first fuel cell stack is shorter than a length of the second branching pipeline connected to the branching portion and the second fuel cell stack. A length of the first merging pipeline connected to the merging portion and the first fuel cell stack is greater than a length of the second merging pipeline connected to the merging portion and the second fuel cell stack.

1 Claim, 8 Drawing Sheets

FUEL CELL SYSTEM

CROSS-REFERENCE TO RELATED APPLICATION

Priority is claimed on Japanese Patent Application No. 2021-050559, filed Mar. 24, 2021, the content of which is incorporated herein by reference.

BACKGROUND OF THE INVENTION

Field of the Invention

The present invention relates to a fuel cell system.

Description of Related Art

In the related art, for example, a fuel cell system including two stacks having a plurality of cells, which are stacked, and disposed in a direction perpendicular to a stacking direction of the plurality of cells, and an oxidant gas supply pipe, a fuel gas supply pipe and a cooling medium supply pipe, which are symmetrically provided at the two stacks on one side in the stacking direction of each of the stacks, is known (for example, see Japanese Unexamined Patent Application, First Publication No. 2005-5196).

SUMMARY OF THE INVENTION

Incidentally, in the above-mentioned fuel cell system, since each pipeline is symmetrically provided at the two stacks, the layout of the fuel cell system is limited, and versatility cannot be improved.

In addition, for example, when a plurality of (three or more) stacks are disposed in parallel to a direction perpendicular to the stacking direction of the plurality of cells, it is difficult to symmetrically provide each pipeline at the plurality of stacks, distribution of a gas and coolant between the plurality of stacks becomes ununiformed, and electric power generation efficiency in the entire system is decreased.

An aspect of the present invention is directed to providing a fuel cell system capable of improving electric power generation efficiency between a plurality of fuel cell stacks.

In order to solve the above-mentioned problems and accomplish purposes related thereto, the present invention employs the following aspects.

(1) A fuel cell system according to an aspect of the present invention includes a plurality of fuel cell stacks having at least a first fuel cell stack and a second fuel cell stack; a supply pipeline through which a fluid supplied to the plurality of fuel cell stacks flows and which has a branching portion; a discharge pipeline through which the fluid discharged from the plurality of fuel cell stacks flows and which has a merging portion; a first branching pipeline connected to the branching portion and the first fuel cell stack; a second branching pipeline connected to the branching portion and the second fuel cell stack; a first merging pipeline connected to the merging portion and the first fuel cell stack; and a second merging pipeline connected to the merging portion and the second fuel cell stack, wherein, when sizes of cross sections of flows in the first branching pipeline, the second branching pipeline, the first merging pipeline and the second merging pipeline are the same, a length of the first branching pipeline is shorter than a length of the second branching pipeline, and a length of the first merging pipeline is greater than a length of the second merging pipeline.

(2) A fuel cell system according to an aspect of the present invention includes a plurality of fuel cell stacks having at least a first fuel cell stack and a second fuel cell stack; a supply pipeline through which a fluid supplied to the plurality of fuel cell stacks flows and which has a branching portion; a discharge pipeline through which the fluid discharged from the plurality of fuel cell stacks flows and which has a merging portion; a first branching pipeline connected to the branching portion and the first fuel cell stack; a second branching pipeline connected to the branching portion and the second fuel cell stack; a first merging pipeline connected to the merging portion and the first fuel cell stack; and a second merging pipeline connected to the merging portion and the second fuel cell stack, wherein a length and a flow cross section of the first branching pipeline are smaller than a length and a flow cross section of the second branching pipeline, and a length and a flow cross section of the first merging pipeline are greater than a length and a flow cross section of the second merging pipeline.

(3) A fuel cell system according to an aspect of the present invention includes a plurality of fuel cell stacks that constitute each of a plurality of stack groups having at least a first stack group and a second stack group; a supply pipeline through which a fluid supplied to the plurality of stack groups flows and which has a branching portion; a discharge pipeline through which the fluid discharged from the plurality of stack groups flows and which has a merging portion; a first branching pipeline connected to the branching portion and the first stack group; a second branching pipeline connected to the branching portion and the second stack group, a first merging pipeline connected to the merging portion and the first stack group; and a second merging pipeline connected to the merging portion and the second stack group, wherein, when sizes of cross sections of flows in the first branching pipeline, the second branching pipeline, the first merging pipeline and the second merging pipeline are the same, a length of the first branching pipeline is shorter than a length of the second branching pipeline, and a length of the first merging pipeline is greater than a length of the second merging pipeline.

(4) A fuel cell system according to an aspect of the present invention includes a plurality of fuel cell stacks that constitute each of a plurality of stack groups having at least a first stack group and a second stack group; a supply pipeline through which a fluid supplied to the plurality of stack groups flows and which has a branching portion; a discharge pipeline through which the fluid discharged from the plurality of stack groups flows and which has a merging portion; a first branching pipeline connected to the branching portion and the first stack group; a second branching pipeline connected to the branching portion and the second stack group, a first merging pipeline connected to the merging portion and the first stack group; and a second merging pipeline connected to the merging portion and the second stack group, wherein a length and a flow cross section of the first branching pipeline are smaller than a length and a flow cross section of the second branching pipeline, and a length and a flow cross section of the first merging pipeline are greater than a length and a flow cross section of the second merging pipeline.

According to the aspect of the above-mentioned (1), pressure losses in the first branching pipeline and the first merging pipeline and pressure losses in the second branching pipeline and the second merging pipeline can be made evenly close to each other, and the fluid can be uniformly supplied to the first fuel cell stack and the second fuel cell stack.

According to the aspect of the above-mentioned (2), a pressure loss in the first branching pipeline and a pressure loss in the second branching pipeline can be made evenly close to each other, and a pressure loss in the first merging pipeline and a pressure loss in the second merging pipeline can be made evenly close to each other. The pressures in the first fuel cell stack and the second fuel cell stack can be made uniformed, and variation in performance and durability can be minimized According to the aspect of the above-mentioned (3), pressure losses in the first branching pipeline and the first merging pipeline and pressure losses in the second branching pipeline and the second merging pipeline can be made evenly close to each other, and the fluid can be uniformly supplied to the first stack group and the second stack group.

According to the aspect of the above-mentioned (4), a pressure loss in the first branching pipeline and a pressure loss in the second branching pipeline can be made evenly close to each other, and a pressure loss in the first merging pipeline and a pressure loss in the second merging pipeline can be made evenly close to each other. The pressures in the first stack group and the second stack group can be made uniformed, and variation in performance and durability can be minimized

DETAILED DESCRIPTION OF THE INVENTION

Hereinafter, a fuel cell system 10 according to an embodiment of the present invention will be described with reference to the accompanying drawings.

Figure 1:
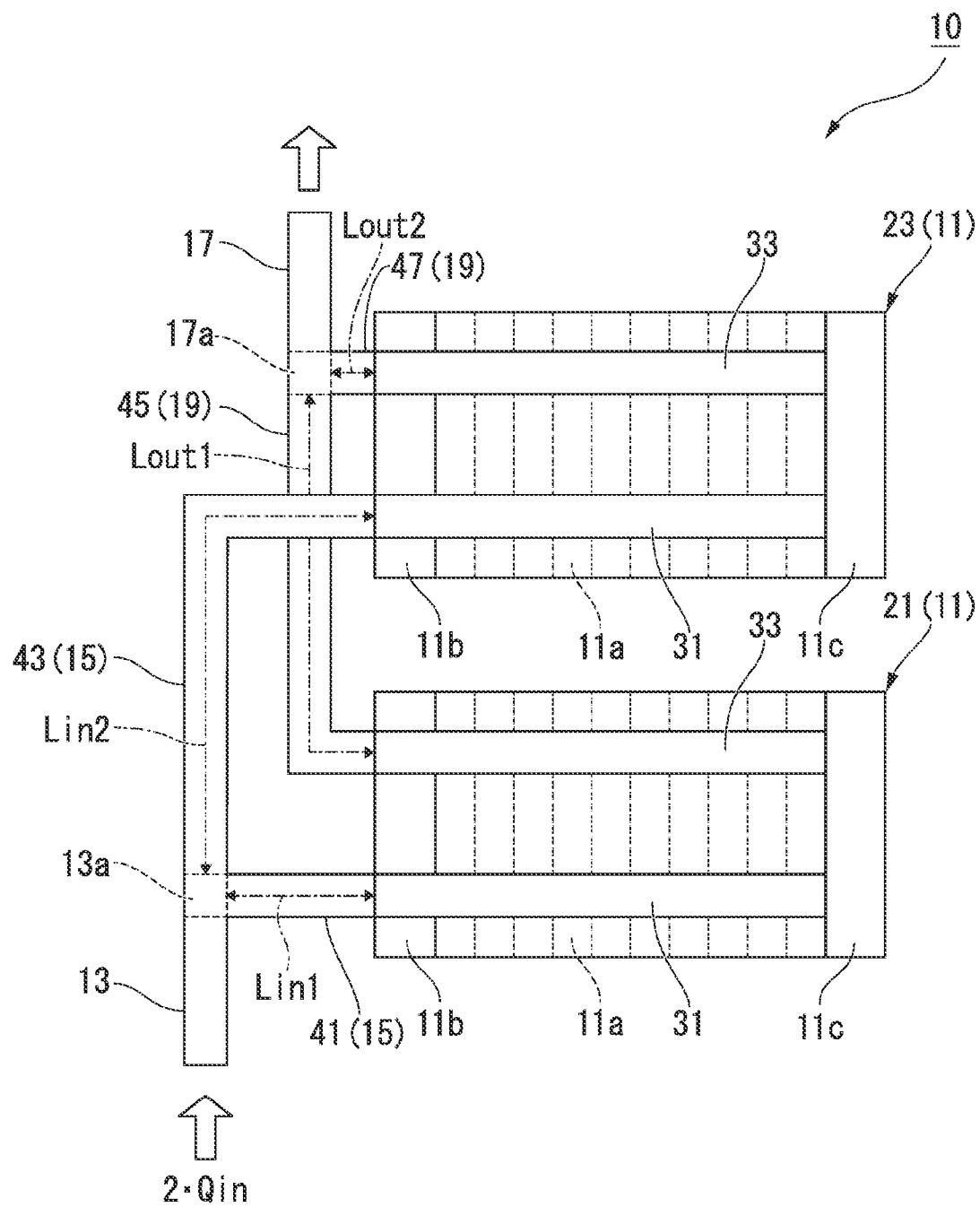
FIG. 1 is a view schematically showing a configuration of a fuel cell system according to an embodiment of the present invention.

FIG. 1 is a view schematically showing a configuration of the fuel cell system 10 according to the embodiment.

As shown in FIG. 1, the fuel cell system 10 of the embodiment includes a plurality of fuel cell stacks 11, a supply pipeline 13, a plurality of branching pipelines 15, a discharge pipeline 17, and a plurality of merging pipelines 19.

The plurality of fuel cell stacks 11 include, for example, a first fuel cell stack 21 and a second fuel cell stack 23.

Each of the fuel cell stacks 11 is, for example, a solid high polymer type fuel cell. Each of the fuel cell stacks 11 includes a plurality of fuel cells 11a that are stacked, and a pair of end plates (a first end plate 11b and a second end plate 11c) that sandwich a stacked body of the plurality of fuel cells from both sides in a stacking direction.

Each of the fuel cells 11a includes an electrolyte electrode structure, and a pair of separators that sandwich the electrolyte electrode structure. The electrolyte electrode structure includes a solid high polymer electrolyte membrane, and a fuel electrode and an oxygen electrode that sandwich the solid high polymer electrolyte membrane. The solid high polymer electrolyte membrane includes a cation exchanger membrane and the like. The fuel electrode (anode) includes an anode catalyst, a gas diffusion layer, and the like. The oxygen electrode (cathode) includes a cathode catalyst, a gas diffusion layer, and the like.

Each of the fuel cell stacks 11 generates electric power using a catalytic reaction between fuel gas containing hydrogen supplied to the anode and oxidant gas such as air or the like containing oxygen supplied to the cathode.

The plurality of fuel cell stacks 11 including the first fuel cell stack 21 and the second fuel cell stack 23 are arranged, for example, sequentially in a direction perpendicular to each stacking direction with the stacking directions of the plurality of fuel cells 11a being parallel to each other.

Each of the fuel cell stacks 11 includes a supply channel 31 through which a predetermined fluid supplied to each of the plurality of fuel cells 11a flows, and a discharge channel 33 through which the predetermined fluid discharged from each of the plurality of fuel cells 11a flows.

The supply channel 31 is connected to the branching pipelines 15 and the supply pipeline 13, which will be described below. For example, the supply channel 31 is connected to the branching pipelines 15 at the first end plates 11b of the fuel cell stacks 11.

The discharge channel 33 is connected to the merging pipelines 19 and the discharge pipeline 17, which will be described. For example, the discharge channel 33 is connected to the merging pipelines 19 on the first end plates 11b of the fuel cell stacks 11.

Each of the supply channel 31 and the discharge channel 33 is disposed in the stacking direction of the plurality of fuel cells 11a. A flowing direction of the predetermined fluid in the supply channel 31 and a flowing direction of the predetermined fluid in the discharge channel 33 are directions opposite in the stacking direction. For example, the flowing direction of the predetermined fluid in the supply channel 31 is a direction from the side of the first end plate 11b toward the second end plate 11c, and the flowing direction of the predetermined fluid in the discharge channel 33 is a direction from the side of the second end plate 11c toward the first end plate 11b.

The supply channel 31 includes a fuel supply channel through which the fuel gas flows, an oxidant supply channel through which the oxidant gas flows, and a coolant supply channel through which a cooling medium supplied to cool the plurality of fuel cells 11a flows.

The discharge channel 33 includes a fuel discharge channel through which the fuel gas flows, an oxidant discharge channel through which the oxidant gas flows, and a coolant discharge channel through which the cooling medium discharged after cooling the plurality of fuel cells 11a flows.

The supply pipeline 13 includes a branching portion 13a connected to the plurality of branching pipelines 15. A predetermined fluid supplied to the plurality of fuel cell stacks 11 flows through the supply pipeline 13 and the plurality of branching pipelines 15. The number of the plurality of branching pipelines 15 is the same as the number of the plurality of fuel cell stacks 11. Each of the plurality of branching pipelines 15 includes, for example, a first branching pipeline 41 and a second branching pipeline 43. The first branching pipeline 41 is connected to the supply channel 31 of the first fuel cell stack 21. The second branching pipeline 43 is connected to the supply channel 31 of the second fuel cell stack 23.

The supply pipeline 13 and the branching pipelines 15 include a fuel supply pipeline and a fuel branching pipeline through which the fuel gas flows, an oxidant supply pipeline and an oxidant branching pipeline through which the oxidant gas flows, and a coolant supply pipeline and a coolant branching pipeline through which the cooling medium flows.

The discharge pipeline 17 includes a merging portion 17a connected to the plurality of merging pipelines 19. A predetermined fluid discharged from the plurality of fuel cell stacks 11 flows through the discharge pipeline 17 and the plurality of merging pipelines 19. The number of the plurality of merging pipelines 19 is the same as the number of the plurality of fuel cell stacks 11. Each of the plurality of merging pipelines 19 includes, for example, a first merging pipeline 45 and a second merging pipeline 47. The first merging pipeline 45 is connected to the discharge channel 33 of the first fuel cell stack 21. The second merging pipeline 47 is connected to the discharge channel 33 of the second fuel cell stack 23.

The discharge pipeline 17 and the merging pipelines 19 include a fuel discharge pipeline and a fuel merging pipeline through which the fuel gas flows, an oxidant discharge pipeline and an oxidant merging pipeline through which the oxidant gas flows, and a coolant discharge pipeline and a coolant merging pipeline through which the cooling medium flows.

In the embodiment, sizes of cross sections of flows of the predetermined fluid in each of the plurality of branching pipelines 15 and each of the plurality of merging pipelines 19 are the same. The size of the cross section is, for example, a diameter of a circular pipe, a hydraulic power equivalent diameter of a pipeline having other cross-sectional shape than the circular pipe (an equivalent diameter: a diameter of an equivalent circular pipe), or the like.

A length Lin1 of the first branching pipeline 41 connected between the branching portion 13a of the supply pipeline 13 and the supply channel 31 of the first fuel cell stack 21 is relatively smaller than a length Lin2 of the second branching pipeline 43 connected between the branching portion 13a of the supply pipeline 13 and the supply channel 31 of the second fuel cell stack 23 (Lin1<Lin2).

A length Lout1 of the first merging pipeline 45 connected between the merging portion 17a of the discharge pipeline 17 and the discharge channel 33 of the first fuel cell stack 21 is relatively greater than a length Lout2 of the second merging pipeline 47 connected between the merging portion 17a of the discharge pipeline 17 and the discharge channel 33 of the second fuel cell stack 23 (Lout1>Lout2).

Figure 2:
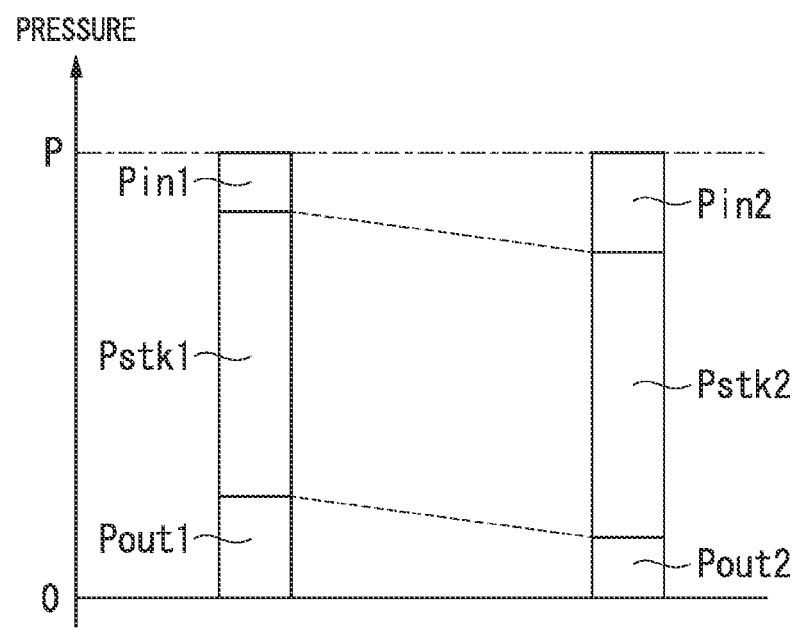
FIG. 2 is a view showing an example of a pressure of a predetermined fluid for each fuel cell stack of the fuel cell system according to the embodiment of the present invention.

FIG. 2 is a view showing an example of a pressure of a predetermined fluid in each of the fuel cell stacks 11 of the fuel cell system 10 according to the embodiment.

In the example shown in FIG. 2, as shown in the following mathematical expression (1), a sum of the length Lin1 of the first branching pipeline 41 and the length Lout1 of the first merging pipeline 45 (Lin1+Lout1) is the same as a sum of the length Lin2 of the second branching pipeline 43 and the length Lout2 of the second merging pipeline 47 (Lin2+Lout2).

$$Lin1+Lout1=Lin2+Lout2 \tag{1}$$

In FIG. 2, when the pressure in the branching portion 13a of the supply pipeline 13 is set as a predetermined pressure P and the pressure in the merging portion 17a of the discharge pipeline 17 is set as zero, correspondence between a pressure loss Pin1 in the first branching pipeline 41, a pressure loss Pstk1 in the first fuel cell stack 21 and a pressure loss Pout1 in the first merging pipeline 45, and correspondence between a pressure loss Pin2 in the second branching pipeline 43, a pressure loss Pstk2 in the second fuel cell stack 23 and a pressure loss Pout2 in the second merging pipeline 47 are shown.

As shown in FIG. 2, since the length Lin1 of the first branching pipeline 41 is relatively smaller than the length Lin2 of the second branching pipeline 43, the pressure loss Pin1 in the first branching pipeline 41 is relatively smaller than the pressure loss Pin2 in the second branching pipeline 43. In addition, since the length Lout1 of the first merging pipeline 45 is relatively greater than the length Lout2 of the second merging pipeline 47, the pressure loss Pout1 of the first merging pipeline 45 is relatively greater than the pressure loss Pout2 of the second merging pipeline 47. When the pressure loss Pstk1 in the first fuel cell stack 21 is the same as the pressure loss Pstk2 in the second fuel cell stack 23, the pressure loss from the branching portion 13a of the supply pipeline 13 to the merging portion 17a of the discharge pipeline 17 is the same for each of the fuel cell stacks 21 and 23 by satisfying the above-mentioned mathematical expression (1).

As described above, the fuel cell system 10 of the embodiment can bring the pressure loss in the first branching pipeline 41 and the first merging pipeline 45 and the pressure loss in the second branching pipeline 43 and the second merging pipeline 47 close to each other evenly according to (Lin1<Lin2) and (Lout1>Lout2). Accordingly, the fluid can be uniformly supplied to the first fuel cell stack 21 and the second fuel cell stack 23.

The pressure loss from the branching portion 13a of the supply pipeline 13 to the merging portion 17a of the discharge pipeline 17 can be the same for each of the fuel cell stacks 21 and 23 by satisfying the above-mentioned mathematical expression (1).

Variants

Hereinafter, variants of the embodiment will be described. Further, the same components as in the above-mentioned embodiment are designated by the same reference signs and description thereof will be omitted and simplified.

In the above-mentioned embodiment, while sizes of cross sections of flows of a predetermined fluid in each of the plurality of branching pipelines 15 and each of the plurality of merging pipelines 19 are the same, there is no limitation thereto.

Figure 3:
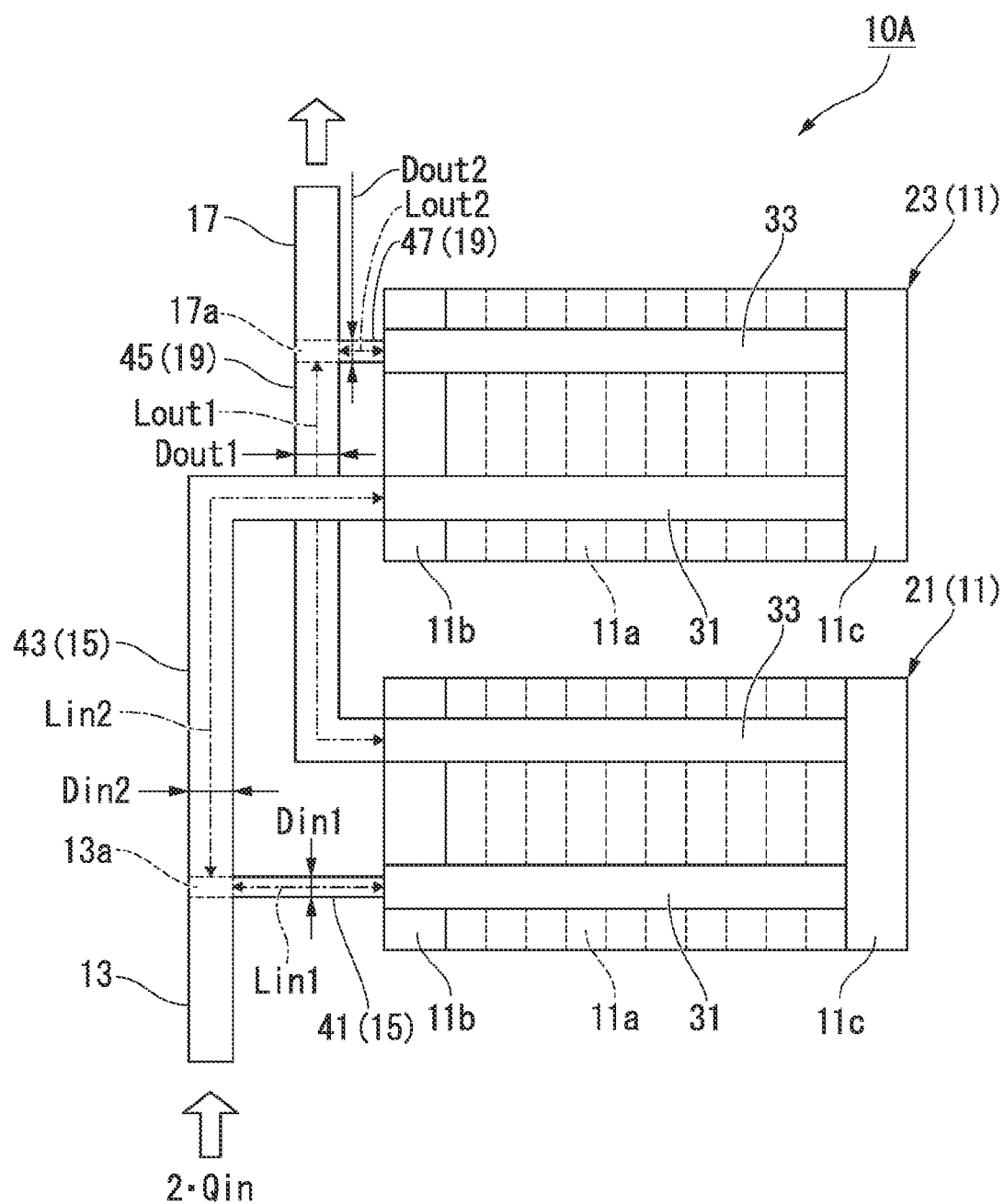
FIG. 3 is a view schematically showing a configuration of a fuel cell system according to a first variant of the embodiment of the present invention.

FIG. 3 is a view schematically showing a configuration of a fuel cell system 10A according to a first variant of the embodiment.

As shown in FIG. 3, in the fuel cell system 10A of the first variant, a size of a cross section of a flow of the first branching pipeline 41 is relatively smaller than a size of a cross section of a flow of the second branching pipeline 43, and a size of a cross section of a flow of the first merging pipeline 45 is relatively greater than a size of a cross section of a flow of the second merging pipeline 47.

For example, a hydraulic power equivalent diameter Din1 of the first branching pipeline 41 is relatively smaller than a hydraulic power equivalent diameter Din2 of the second branching pipeline 43 (Din1<Din2), and a hydraulic power equivalent diameter Dout1 of the first merging pipeline 45 is relatively greater than a hydraulic power equivalent diameter Dout2 of the second merging pipeline 47 (Dout1>Dout2).

Figure 4:
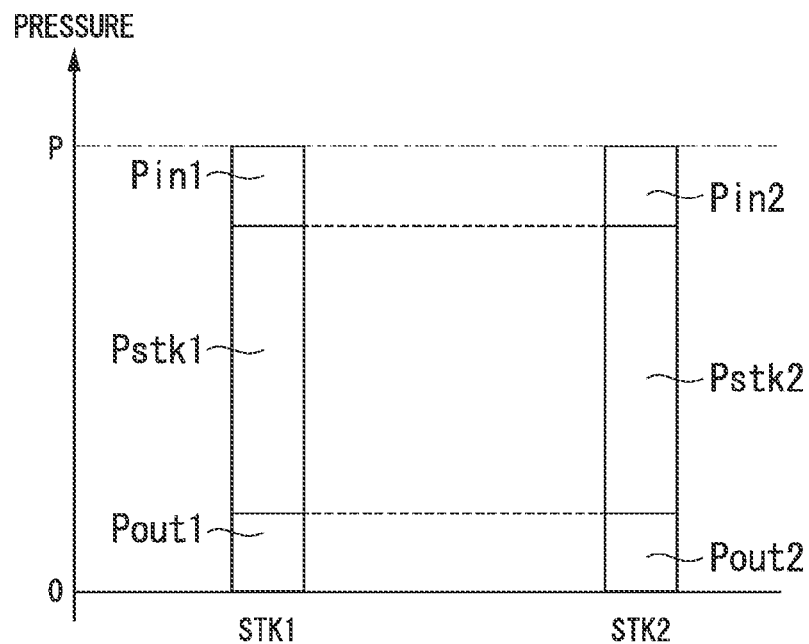
FIG. 4 is a view showing an example of a pressure of a predetermined fluid in each fuel cell stack of the fuel cell system according to the first variant of the embodiment of the present invention.

FIG. 4 is a view showing an example of a pressure of a predetermined fluid in each of the fuel cell stacks 11 of the fuel cell system 10A according to the first variant.

In the example shown in FIG. 4, as shown in the following mathematical expression (2), in each of the fuel cell stacks 21 and 23, a ratio of the length of each of the pipelines 41 and 43 and the fourth power of the hydraulic power equivalent diameter on the side of the branching portion 13a and a ratio of the length of each of the pipelines 45 and 47 and the fourth power of the hydraulic power equivalent diameter on the side of the merging portion 17a are the same.

$$\left.\begin{array}{c}\dfrac{Lin1}{Din1^4}=\dfrac{Lout1}{Dout1^4}\\[4pt]\dfrac{Lin2}{Din2^4}=\dfrac{Lout2}{Dout2^4}\end{array}\right\} \quad (2)$$

The ratio ($L/D^4$) between the length (L) of each of the pipelines 41, 43, 45 and 47 and the fourth power of the hydraulic power equivalent diameter (D) in the above-mentioned mathematical expression (2) is a parameter in proportion to the pressure loss of the predetermined fluid flowing through each of the pipelines 41, 43, 45 and 47. That is, the pressure loss is in proportion to the length (L) and in inverse proportion to the fourth power of the hydraulic power equivalent diameter (D).

When the pressure in the branching portion 13a of the supply pipeline 13 is set as the predetermined pressure P and the pressure in the merging portion 17a of the discharge pipeline 17 is set as zero, FIG. 4 shows correspondence between the pressure loss Pin1 in the first branching pipeline 41, the pressure loss Pstk1 in the first fuel cell stack 21 and the pressure loss Pout1 in the first merging pipeline 45, and correspondence between the pressure loss Pin2 in the second branching pipeline 43, the pressure loss Pstk2 in the second fuel cell stack 23 and the pressure loss Pout2 in the second merging pipeline 47.

In FIG. 4, the length Lin1 of the first branching pipeline 41 is relatively smaller than the length Lin2 of the second branching pipeline 43, however the hydraulic power equivalent diameter Din1 of the first branching pipeline 41 is relatively smaller than the hydraulic power equivalent diameter Din2 of the second branching pipeline 43, and thus, the pressure loss Pin1 in the first branching pipeline 41 is the same as the pressure loss Pin2 in the second branching pipeline 43.

In addition, the length Lout1 of the first merging pipeline 45 is relatively greater than the length Lout2 of the second merging pipeline 47, however the hydraulic power equivalent diameter Dout1 of the first merging pipeline 45 is relatively greater than the hydraulic power equivalent diameter Dout2 of the second merging pipeline 47, and thus, the pressure loss Pout1 in the first merging pipeline 45 is the same as the pressure loss Pout2 in the second merging pipeline 47. When the pressure loss Pstk1 in the first fuel cell stack 21 is the same as the pressure loss Pstk2 of the second fuel cell stack 23, the pressure loss from the branching portion 13a of the supply pipeline 13 to the merging portion 17a of the discharge pipeline 17 is the same for each of the fuel cell stacks 21 and 23 by satisfying the above-mentioned mathematical expression (2).

In the first variant, the length (L) and the hydraulic power equivalent diameter (D) of each of the pipelines 41, 43, 45 and 47 may be set to satisfy, for example, the following mathematical expression (3).

The following mathematical expression (3) is expressed by the length Lin1 and the hydraulic power equivalent diameter Din1 of the first branching pipeline 41, the length Lout1 and the hydraulic power equivalent diameter Dout1 of the first merging pipeline 45, the length Lin2 and the hydraulic power equivalent diameter Din2 of the second branching pipeline 43, the length Lout2 and the hydraulic power equivalent diameter Dout2 of the second merging pipeline 47, a fluid flow rate Qin for each of the fuel cell stacks 11 supplied upon rated output, a pressure loss ΔPstk in each of the fuel cell stacks 11 when the predetermined fluid of the fluid flow rate Qin is supplied to each of the fuel cell stacks 11, a viscosity coefficient μ of the predetermined fluid, a predetermined threshold α, a flow rate difference β of the predetermined fluid between the first fuel cell stack 21 and the second fuel cell stack 23, and a predetermined coefficient b.

$$\left.\begin{array}{c}-\alpha \le \beta = \dfrac{b\cdot Qin\left(\dfrac{Lin2}{Din2^4}+\dfrac{Lout2}{Dout2^4}-\right)}{b\cdot Qin\left(\dfrac{Lin2}{Din2^4}+\dfrac{Lout2}{Dout2^4}+\right)+2\cdot \Delta Pstk} \le \alpha\\[4pt] \alpha = 0.2\\[4pt] b = \dfrac{128\cdot \mu}{\pi}\end{array}\right\} \quad (3)$$

The predetermined threshold α in the above-mentioned mathematical expression (3) indicates allowance with respect to the variation of the flow rate of the predetermined fluid between the first fuel cell stack 21 and the second fuel cell stack 23, and allows the variation of the flow rate of 20%, for example, when α=0.2. The predetermined threshold α is set, for example, within the range of the flow rate required to secure the desired electric power generation.

Figure 5:
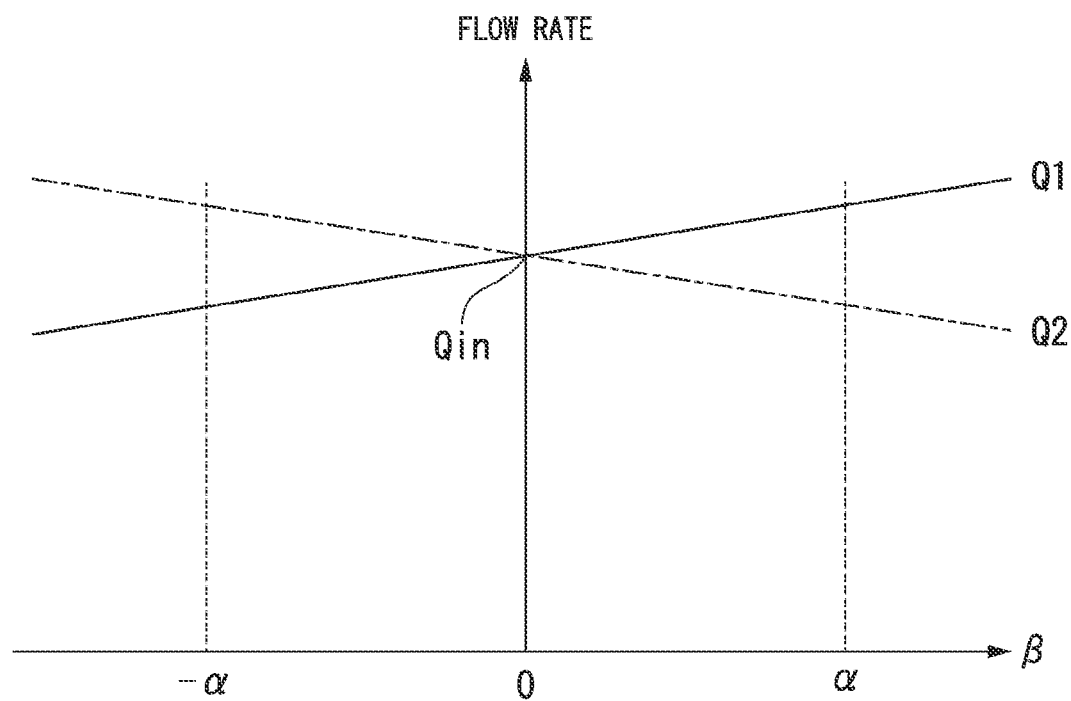
FIG. 5 is a view showing correspondence between a flow rate of a predetermined fluid and a flow rate difference in each fuel cell stack of the fuel cell system according to the first variant of the embodiment of the present invention.

FIG. 5 is a view showing correspondence between the flow rates Q1 and Q2 and the flow rate difference 13 of the predetermined fluid in each of the fuel cell stacks 11 of the fuel cell system 10A according to the first variant.

As shown in FIG. 5, since the flow rate difference 13 is defined by the predetermined threshold α, an increase in difference between the flow rate Q1 of the predetermined fluid in the first fuel cell stack 21 and the flow rate Q2 of the predetermined fluid in the second fuel cell stack 23 is minimized, and the same fluid flow rate Qin is supplied to the fuel cell stacks 21 and 23.

According to the first variant, the pressure loss in the first branching pipeline 41 and the pressure loss in the second branching pipeline 43 can be made evenly close to each other by (Lin1<Lin2) and (Lout1>Lout2) and (Din1<Din2) and (Dout1>Dout2), and the pressure loss in the first merging pipeline 45 and the pressure loss in the second merging pipeline 47 can be made evenly close to each other. Accordingly, the pressure in each of the fuel cell stacks 21 and 23 can be made uniformed, and variation in performance and durability can be minimized The pressure loss from the branching portion 13a of the supply pipeline 13 to the merging portion 17a of the discharge pipeline 17 can be the same for each of the fuel cell stacks 21 and 23 by satisfying the above-mentioned mathematical expression (3).

While the plurality of fuel cell stacks 11 of the fuel cell system 10 of the above-mentioned embodiment include the first fuel cell stack 21 and the second fuel cell stack 23, there is no limitation thereto.

Figure 6:
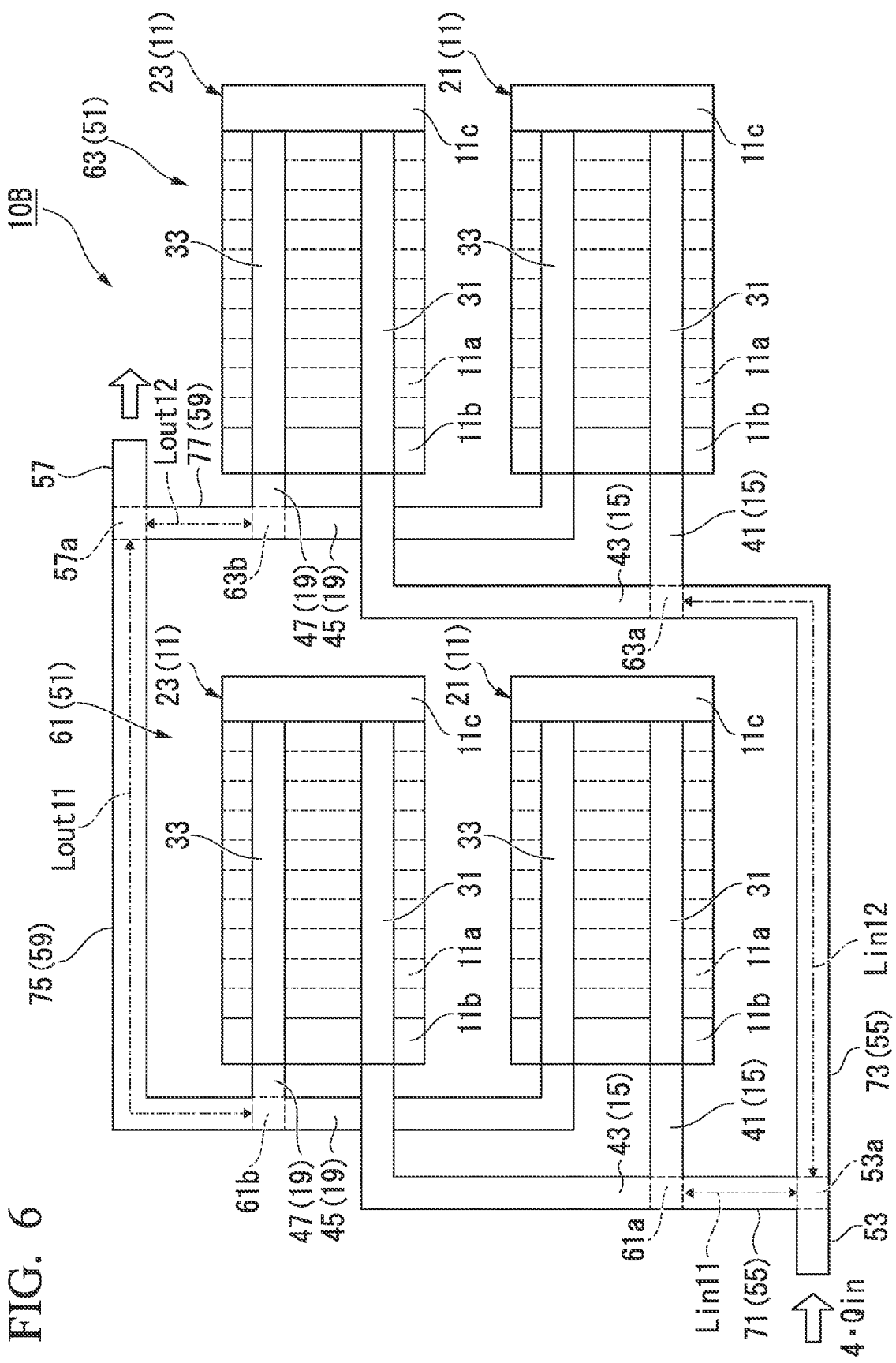
FIG. 6 is a view schematically showing a configuration of a fuel cell system according to a second variant of the embodiment of the present invention.

FIG. 6 is a view schematically showing a configuration of a fuel cell system 10B according to a second variant of the embodiment.

As shown in FIG. 6, the fuel cell system 10B of the second variant includes a plurality of stack groups 51, a supply pipeline 53, a plurality of branching pipelines 55, a discharge pipeline 57, and a plurality of merging pipelines 59.

The plurality of stack groups 51 include, for example, a first stack group 61 and a second stack group 63.

Each of the stack groups 51 includes, for example, the first fuel cell stack 21 and the second fuel cell stack 23, the first branching pipeline 41 and the second branching pipeline 43, the first merging pipeline 45 and the second merging pipeline 47 described in the above-mentioned embodiment. The first branching pipeline 41 and the second branching pipeline 43 of each of the stack groups 51 are connected to a supply portion corresponding to the branching portion 13a of the supply pipeline 13 described in the above-mentioned embodiment (for example a first supply portion 61a of the first stack group 61 and a second supply portion 63a of the second stack group 63). The first merging pipeline 45 and the second merging pipeline 47 of each of the stack groups 51 are connected to a discharge portion corresponding to the merging portion 17a of the discharge pipeline 17 described in the above-mentioned embodiment (for example, a first discharge portion 61b of the first stack group 61 and a second discharge portion 63b of the second stack group 63).

The supply pipeline 53 of the second variant includes a branching portion 53a connected to the plurality of branching pipelines 55. A predetermined fluid supplied to the plurality of stack groups 51 flows through the supply pipeline 53 and the plurality of branching pipelines 55. The number of the plurality of branching pipelines 55 is the same as the number of the plurality of stack groups 51. The plurality of branching pipelines 55 include, for example, a first branching pipeline 71 and a second branching pipeline 73. The first branching pipeline 71 is connected to the first supply portion 61a of the first stack group 61. The second branching pipeline 73 is connected to the second supply portion 63a of the second stack group 63.

The supply pipeline 53 and the branching pipelines 55 include a fuel supply pipeline and a fuel branching pipeline through which the fuel gas flows, an oxidant supply pipeline and an oxidant branching pipeline through which the oxidant gas flows, and a coolant supply pipeline and a coolant branching pipeline through which the cooling medium flows.

The discharge pipeline 57 of the second variant includes a merging portion 57a connected to the plurality of merging pipelines 59. A predetermined fluid discharged from the plurality of stack groups 51 flows through the discharge pipeline 57 and the plurality of merging pipelines 59. The number of the plurality of merging pipelines 59 is the same as the number of the plurality of stack groups 51. The plurality of merging pipelines 59 include, for example, a first merging pipeline 75 and a second merging pipeline 77. The first merging pipeline 75 is connected to the first discharge portion 61b of the first stack group 61. The second merging pipeline 77 is connected to the second discharge portion 63b of the second stack group 63.

The discharge pipeline 57 and the merging pipelines 59 include a fuel discharge pipeline and a fuel merging pipeline through which the fuel gas flows, an oxidant discharge pipeline and an oxidant merging pipeline through which the oxidant gas flows, and a coolant discharge pipeline and a coolant merging pipeline through which the cooling medium flows.

In the second variant, sizes of the cross sections of the flows of the predetermined fluid of each of the plurality of branching pipelines 55 and each of the plurality of merging pipelines 59 are the same. The size of the cross section is, for example, a diameter of a circular pipe, a hydraulic power equivalent diameter (an equivalent diameter: a diameter of an equivalent circular pipe) of a pipeline having another cross-sectional shape other than the circular pipe, or the like.

The length Lin11 of the first branching pipeline 71 connected between the branching portion 53a of the supply pipeline 53 and the first supply portion 61a of the first stack group 61 is relatively smaller than the length Lin12 of the second branching pipeline 73 connected between the branching portion 53a of the supply pipeline 53 and the second supply portion 63a of the second stack group 63 (Lin11<Lin12).

The length Lout11 of the first merging pipeline 75 connected between the merging portion 57a of the discharge pipeline 57 and the first discharge portion 61b of the first stack group 61 is relatively greater than the length Lout12 of the second merging pipeline 77 connected between the merging portion 57a of the discharge pipeline 57 and the second discharge portion 63b of the second stack group 63 (Lout11>Lout12).

Figure 7:
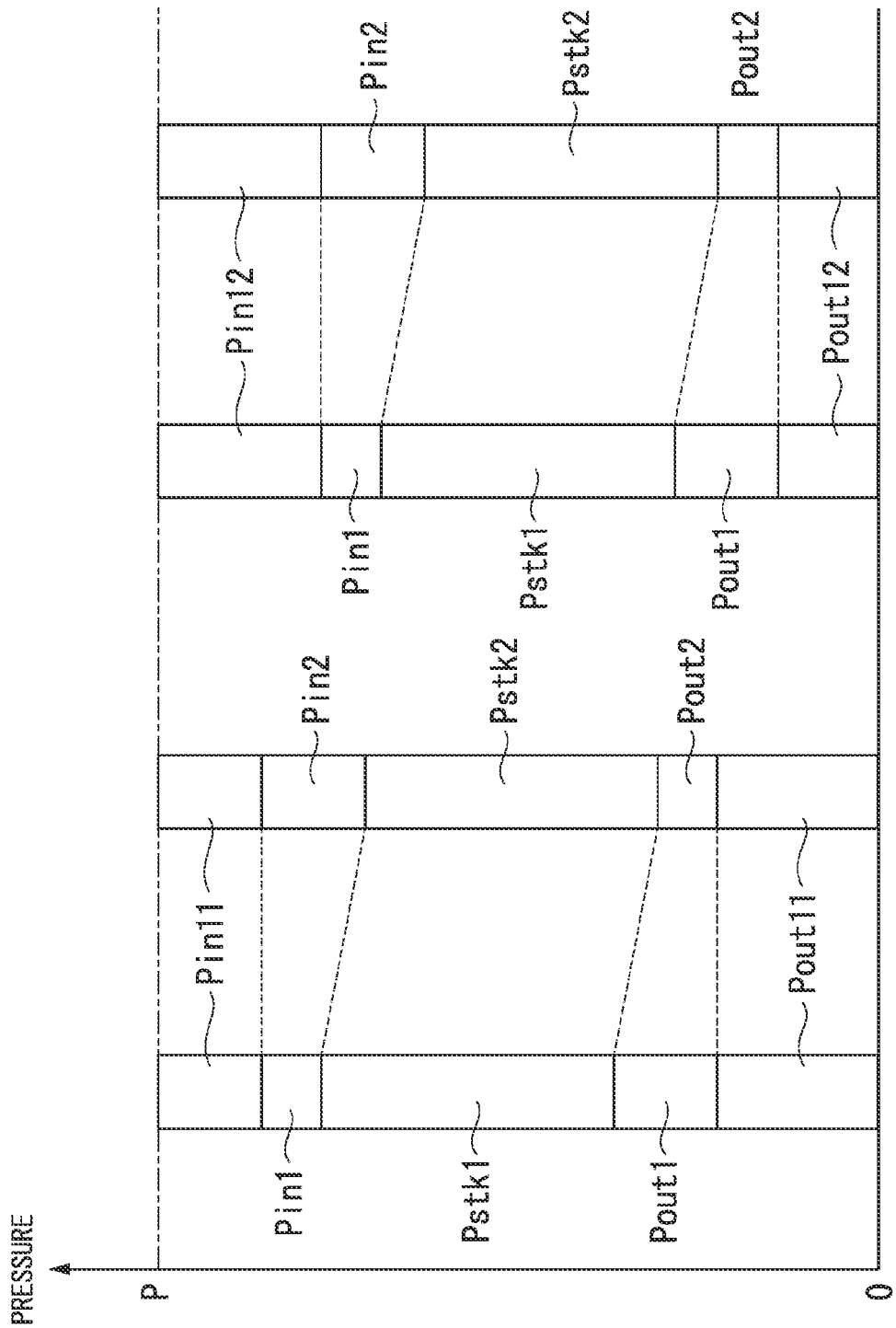
FIG. 7 is a view showing an example of a pressure of a predetermined fluid in each fuel cell stack of the fuel cell system according to the second variant of the embodiment of the present invention.

FIG. 7 is a view showing an example of a pressure of a predetermined fluid in each of the fuel cell stacks 11 of the fuel cell system 10B according to the second variant of the embodiment.

In the example shown in FIG. 7, as shown in the following mathematical expression (4), a sum of the length Lin11 of the first branching pipeline 71 and the length Lout11 of the first merging pipeline 75 (Lin11+Lout11) is the same as a sum of the length Lin12 of the second branching pipeline 73 and the length Lout12 of the second merging pipeline 77 (Lin12+Lout12).

$$Lin11+Lout11=Lin12+Lout12 \quad (4)$$

When the pressure in the branching portion 53a of the supply pipeline 53 is set as the predetermined pressure P and the pressure in the merging portion 57a of the discharge pipeline 57 is set as zero, FIG. 7 shows correspondence between the pressure loss Pin11 in the first branching pipeline 71, each of the pressure losses Pin1, Pstk1, Pout1, Pin2, Pstk2 and Pout2 in the first stack group 61 and the pressure loss Pout11 in the first merging pipeline 75, and correspondence between the pressure loss Pin12 in the second branching pipeline 73, each of the pressure losses Pin1, Pstk1, Pout1, Pin2, Pstk2 and Pout2 in the second stack group 63 and the pressure loss Pout12 in the second merging pipeline 77.

As shown in FIG. 7, since the length Lin11 of the first branching pipeline 71 is relatively smaller than the length Lin12 of the second branching pipeline 73, the pressure loss Pin11 in the first branching pipeline 71 is relatively smaller than the pressure loss Pin12 in the second branching pipeline 73. In addition, since the length Lout11 of the first merging pipeline 75 is relatively greater than the length Lout12 of the second merging pipeline 77, the pressure loss Pout11 in the first merging pipeline 75 is relatively greater than the pressure loss Pout12 in the second merging pipeline 77. When the pressure loss in the first stack group 61 is the same as the pressure loss in the second stack group 63, the pressure loss from the branching portion 53a of the supply pipeline 53 to the merging portion 57a of the discharge pipeline 57 is the same for each of the stack groups 61 and 63 by satisfying the above-mentioned mathematical expression (4).

According to the second variant, the pressure loss in the first branching pipeline 71 and the first merging pipeline 75 and the pressure loss in the second branching pipeline 73 and the second merging pipeline 77 can be made evenly close to each other by (Lin11<Lin12) and (Lout11>Lout12). Accordingly, the fluid can be uniformly supplied to the first stack group 61 and the second stack group 63.

The pressure loss from the branching portion 13a of the supply pipeline 13 to the merging portion 17a of the discharge pipeline 17 can be made same for each of the fuel cell stacks 21 and 23 by satisfying the above-mentioned mathematical expression (4).

In the above-mentioned second variant, while the sizes of the cross sections of the flows of the predetermined fluid in each of the plurality of branching pipelines 55 and each of the plurality of merging pipelines 59 are the same, there is no limitation thereto.

Figure 8:
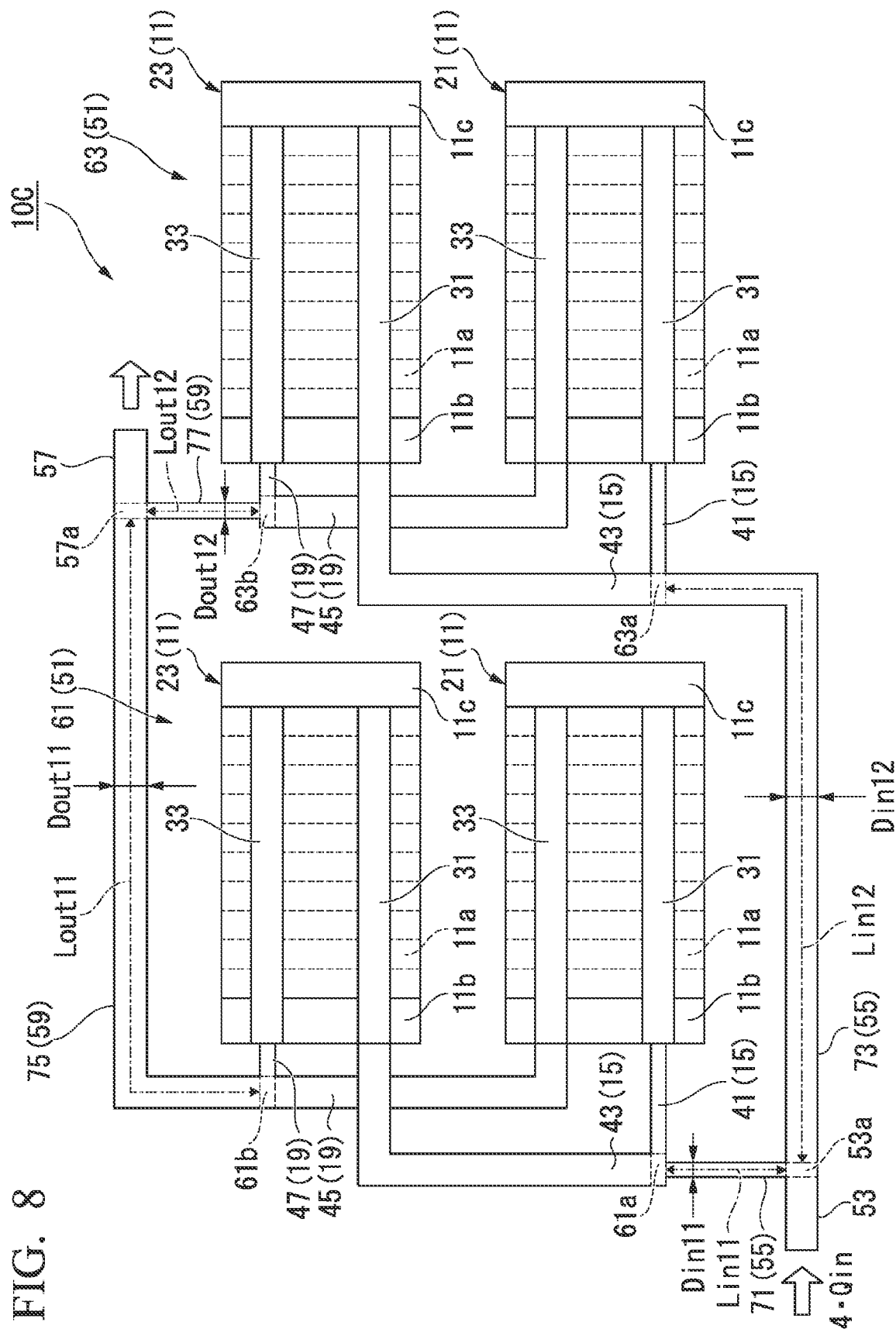
FIG. 8 is a view schematically showing a configuration of a fuel cell system according to a third variant of the embodiment of the present invention.

FIG. 8 is a view schematically showing a configuration of a fuel cell system 10C of a third variant of the embodiment.

As shown in FIG. 8, in the fuel cell system 10C of the third variant, a size of a cross section of a flow in the first branching pipeline 71 is relatively smaller than a size of a cross section of a flow of the second branching pipeline 73, and a size of a cross section of a flow of the first merging pipeline 75 is relatively greater than a size of a cross section of a flow of the second merging pipeline 77.

For example, the hydraulic power equivalent diameter Din11 of the first branching pipeline 71 is relatively smaller than the hydraulic power equivalent diameter Din12 of the second branching pipeline 73 (Din11<Din12), and the hydraulic power equivalent diameter Dout11 of the first merging pipeline 75 is relatively greater than the hydraulic power equivalent diameter Dout12 of the second merging pipeline 77 (Dout11>Dout12).

Figure 9:
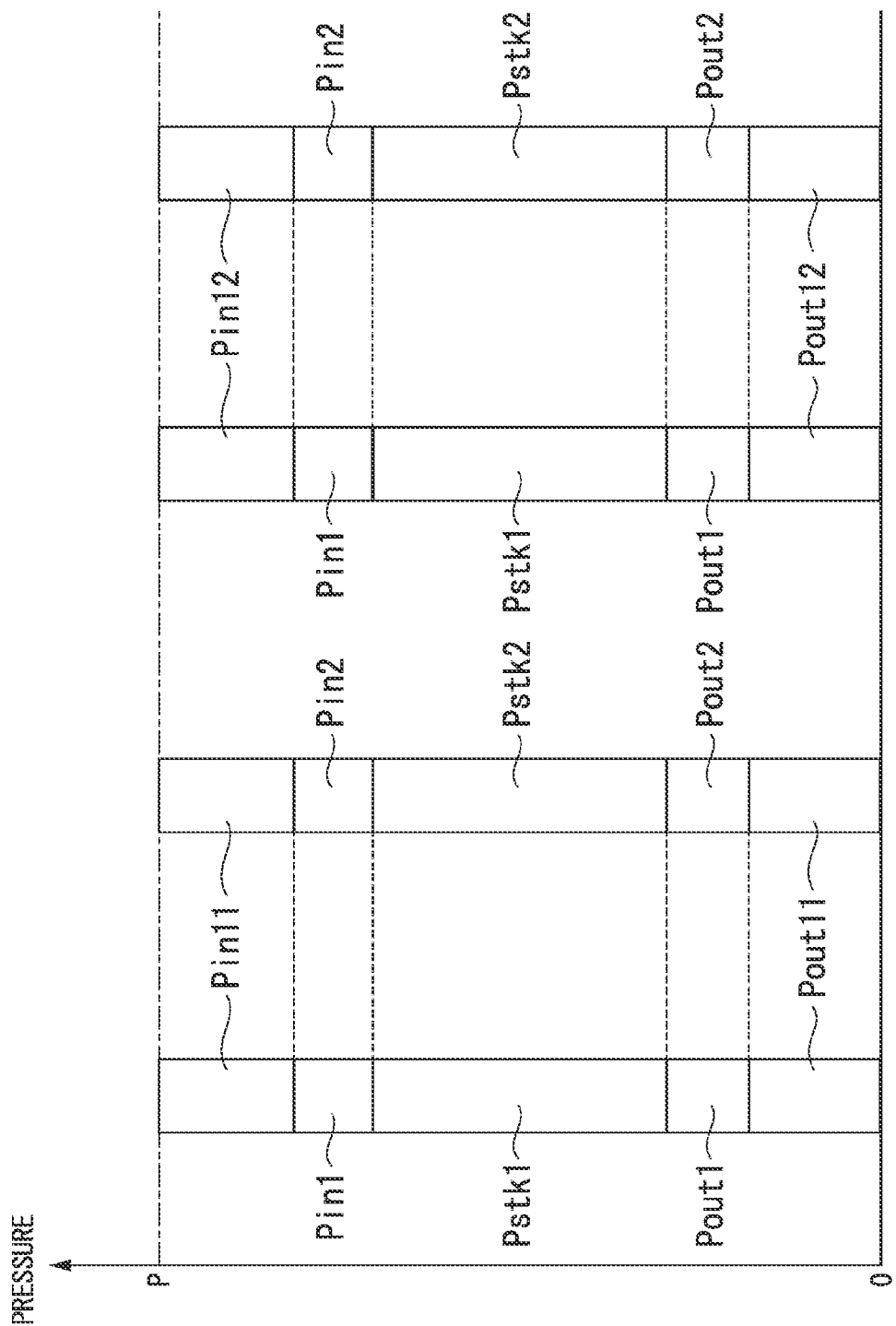
FIG. 9 is a view showing an example of a pressure of a predetermined fluid in each fuel cell stack of the fuel cell system according to the third variant of the embodiment of the present invention.

FIG. 9 is a view showing an example of a pressure of a predetermined fluid in each of the fuel cell stacks 11 of the fuel cell system 10C according to the third variant.

In the example shown in FIG. 9, as shown in the following mathematical expression (5), in each of the stack groups 61 and 63, a ratio between the length of each of the pipelines 71 and 73 and the fourth power of the hydraulic power equivalent diameter on the side of the branching portion 53a is the same as a ratio between the length of each of the pipelines 75 and 77 and the fourth power of the hydraulic power equivalent diameter on the side of the merging portion 57a.

$$\left. \begin{array}{l} \frac{Lin11}{Din11^4} = \frac{Lout11}{Dout11^4} \\ \frac{Lin12}{Din12^4} = \frac{Lout12}{Dout12^4} \end{array} \right\} \quad (5)$$

A ratio (L/D$^4$) between the length (L) of each of the pipelines 71, 73, 75 and 77 and the fourth power of the hydraulic power equivalent diameter (D) in the above-mentioned mathematical expression (5) is a parameter in proportion to the pressure loss of the predetermined fluid flowing through each of the pipelines 71, 73, 75 and 77. That is, the pressure loss is in proportion to the length (L) and in inverse proportion to the fourth power of the hydraulic power equivalent diameter (D).

In addition, in the fuel cell system 10C of the third variant, as shown in the above-mentioned mathematical expression (2) like the fuel cell system 10A of the above-mentioned first variant, in each of the fuel cell stacks 21 and 23, a ratio between the length of each of the pipelines 41 and 43 and the fourth power of the hydraulic power equivalent diameter on the side of the second supply portion 63a is the same as a ratio between the length of each of the pipelines 45 and 47 and the fourth power of the hydraulic power equivalent diameter on the side of the second discharge portion 63b.

When the pressure in the branching portion 53a of the supply pipeline 53 is set as the predetermined pressure P and the pressure in the merging portion 57a of the discharge pipeline 57 is set as zero, FIG. 9 shows correspondence between the pressure loss Pin11 in the first branching pipeline 71, each of the pressure losses Pin1, Pstk1, Pout1, Pin2, Pstk2 and Pout2 in the first stack group 61 and the pressure loss Pout11 in the first merging pipeline 75, and correspondence between the pressure loss Pin12 in the second branching pipeline 73, each of the pressure losses Pin1, Pstk1, Pout1, Pin2, Pstk2 and Pout2 in the second stack group 63 and the pressure loss Pout12 in the second merging pipeline 77.

In FIG. 9, the length Lin11 of the first branching pipeline 71 is relatively smaller than the length Lin12 of the second branching pipeline 73, the hydraulic power equivalent diameter Din11 of the first branching pipeline 71 is relatively smaller than the hydraulic power equivalent diameter Din12 of the second branching pipeline 73, and thus, the pressure loss Pin11 in the first branching pipeline 71 is the same as the pressure loss Pin12 in the second branching pipeline 73.

In addition, the length Lout11 of the first merging pipeline 75 is relatively greater than the length Lout12 of the second merging pipeline 77, the hydraulic power equivalent diameter Dout11 of the first merging pipeline 75 is relatively greater than the hydraulic power equivalent diameter Dout12 of the second merging pipeline 77, and thus, the pressure loss Pout11 in the first merging pipeline 75 is the same as the pressure loss Pout12 in the second merging pipeline 77.

When the pressure loss in the first stack group 61 is the same as the pressure loss in the second stack group 63, the pressure loss from the branching portion 53a of the supply pipeline 53 to the merging portion 57a of the discharge pipeline 57 is the same for each of the stack groups 61 and 63 by satisfying the above-mentioned mathematical expression (5).

In the third variant, the length (L) and the hydraulic power equivalent diameter (D) of each of the pipelines 71, 73, 75 and 77 may be set to satisfy, for example, the following mathematical expression (6).

The following mathematical expression (6) is expressed by the length Lin11 and the hydraulic power equivalent diameter Din11 of the first branching pipeline 71, the length Lout11 and the hydraulic power equivalent diameter Dout11 of the first merging pipeline 75, the length Lin12 and the hydraulic power equivalent diameter Din12 of the second branching pipeline 73, the length Lout12 and the hydraulic power equivalent diameter Dout12 of the second merging pipeline 77, the fluid flow rate Qin for each of the fuel cell stacks 11 supplied upon rated output, a pressure loss ΔPstk in each of the fuel cell stacks 11 when the predetermined fluid of the fluid flow rate Qin is supplied to each of the fuel cell stacks 11, a viscosity coefficient μ of the predetermined fluid, a predetermined threshold α, a flow rate difference β of the predetermined fluid between the first stack group 61 and the second stack group 63, and a predetermined coefficient b.

$$-\alpha \leq \beta = \frac{b \cdot Qin \left( \frac{Lin12}{Din12^4} + \frac{Lout12}{Dout12^4} - \frac{Lin11}{Din11^4} - \frac{Lout11}{Dout11^4} \right)}{b \cdot Qin \left( \frac{Lin12}{Din12^4} + \frac{Lout12}{Dout12^4} + \frac{Lin11}{Din11^4} + \frac{Lout11}{Dout11^4} \right) + \Delta Pstk} \leq \alpha \quad (6)$$

$$\alpha = 0.2$$
$$b = \frac{128 \cdot \mu}{\pi}$$

The predetermined threshold α in the above-mentioned mathematical expression (6) shows allowance with respect to the variation of the flow rate of the predetermined fluid between the first stack group 61 and the second stack group 63, and allows the variation of the flow rate of 20%, for example, when α=0.2. The predetermined threshold α is set, for example, within a range of a flow rate required to secure the desired electric power generation.

According to the third variant, the pressure loss in the first branching pipeline 71 and the pressure loss in the second branching pipeline 73 can be made evenly close to each other by (Lin11<Lin12) and (Lout11>Lout12) and further (Din11<Din12) and (Dout11>Dout12), and the pressure loss in the first merging pipeline 75 and the pressure loss in the second merging pipeline 77 can be made evenly close to each other. Accordingly, the pressure in each of the stack groups 61 and 63 can be made uniformed, and variation in performance and durability can be minimized.

The pressure loss from the branching portion 53a of the supply pipeline 53 to the merging portion 57a of the discharge pipeline 57 can be the same for each of the stack groups 61 and 63 by satisfying the above-mentioned mathematical expression (6).

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A fuel cell system comprising:
a plurality of fuel cell stacks having at least a first fuel cell stack and a second fuel cell stack;
a supply pipeline through which a fluid supplied to the plurality of fuel cell stacks flows; and
a discharge pipeline through which the fluid discharged from the plurality of fuel cell stacks flows;
wherein
a branching portion is provided within the supply pipeline, the branching portion being a part in which the supply pipeline branches into a first branching pipeline, which first branching pipeline is connected to the first fuel cell stack and supplies the fluid to the first fuel cell stack, and a second branching pipeline, which second branching pipeline is connected to the second fuel cell stack and supplies the fluid to the second fuel cell stack,
a merging portion is provided within the discharge pipeline, the merging portion being a part in which a first merging pipeline, which first merging pipeline is connected to the first fuel cell stack and discharges the fluid from the first fuel cell stack, and a second merging pipeline, which second merging pipeline is connected to the second fuel cell stack and discharges the fluid from the second fuel cell stack, merge with each other, and
a size of a cross section of flow in the first branching pipeline is smaller than a size of a cross section of flow in the second branching pipeline, a size of a cross section of flow in the first merging pipeline is larger than a size of a cross section of flow in the second merging pipeline, a length of the first branching pipeline is shorter than a length of the second branching pipeline, and a length of the first merging pipeline is greater than a length of the second merging pipeline.

* * * * *